Oct. 25, 1949.                M. M. COOK                2,485,700
          TOOL FOR FORCING RESILIENT TIRE BEADS INTO
                  THE DROP CENTER OF WHEEL RIMS
                     Filed March 7, 1945

M. M. Cook
INVENTOR.

BY
ATTORNEYS.

Patented Oct. 25, 1949

2,485,700

UNITED STATES PATENT OFFICE 2,485,700

TOOL FOR FORCING RESILIENT TIRE BEADS INTO THE DROP CENTER OF A WHEEL RIM

Milford Marcuise Cook, Visalia, Calif.

Application March 7, 1945, Serial No. 581,442

1 Claim. (Cl. 157—1.17)

1

This invention relates to a tool for use in removing tires from wheel rims.

An object of the invention is to provide a simple and easily carried tool which constitutes an effective means for performing the desired result.

Another object is to provide a tool designed to push the bead of a tire into the drop center of a wheel rim, after the bead has been pried loose by means of another tire tool, and to provide slippage when the tire is lifted from the rim by means of a tire iron or the like.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

Figure 1:
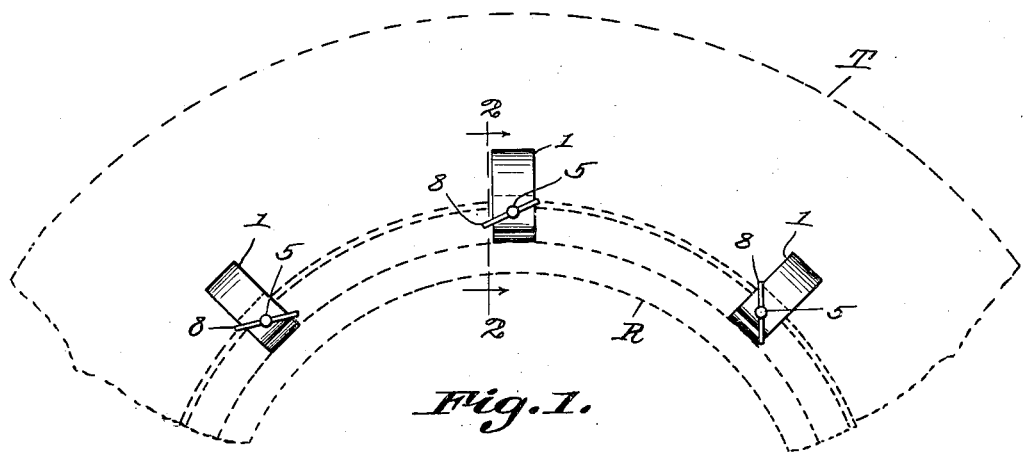
Figure 1 is a side elevation showing a group of these tools applied to a wheel rim and tire, said rim and tire being shown by broken lines.

Referring to the figures by characters of reference, 1 designates the body of the tool which is in the form of a yoke and is curved along its outer periphery from one end to the other. The recess 2 provided by the yoke is proportioned to receive freely one side of a wheel rim R and there is formed in the periphery of this yoke adjacent to one of its ends, a socket 3 in which is journaled a roller 4 which projects a short distance outwardly beyond the yoke.

In the opposite portion of the yoke there is mounted a screw 5 which extends into recess 2 and is provided, within the recess, with a foot 6 having a ball and socket connection with the screw, as indicated at 7. A handle 8 or the like is provided at the outer end of the screw whereby it can be turned readily.

One or more of these tools can be used during a single operation. As a general rule, three are found desirable. In use, a portion of the tire bead is separated from the rim flange with a suitable tire iron sufficiently to permit insertion by hand of the end 9 of one of the devices. Then, other similar devices are applied successively to adjacent portions of the tire bead and rim flange

2 until they are properly separated to permit complete removal of the tire with a tire iron. Stated otherwise, the devices are placed in position successively astride one flange of the rim R at short distances apart with the end 9 of each yoke extended downwardly into the rim and the screw 5 inclined downwardly as far as possible. This brings the roller 4 well above and outwardly from the position shown in Figure 2 so that the end 9 can be pressed downwardly by hand or otherwise into position between the sides of the tire and rim. Using the screw 5 as a handle or lever, the device is pulled upwardly with the end 9 as a fulcrum and wheel 4 thus is brought into position where it can roll radially of the engaged portion of the tire and at the same time push the tire inwardly substantially to the position shown in Figure 2. Screw 5 is then turned inwardly so as to force the foot 6 against the side of the rim. This will lock the device with the tire pressed inwardly by the roller and held partly unseated as shown at T in Figure 2. After the tire has thus been pressed in at spaced points, it can be removed by suitable leverage exerted against the opposite side, the rollers of the several tools providing a slippage which will facilitate the removal.

Importance is attached to the fact that the tool used as explained is light and compact and can be easily carried. Furthermore, it is handled readily and avoids the necessity of employing large complicated devices such as commonly used.

Figure 2:
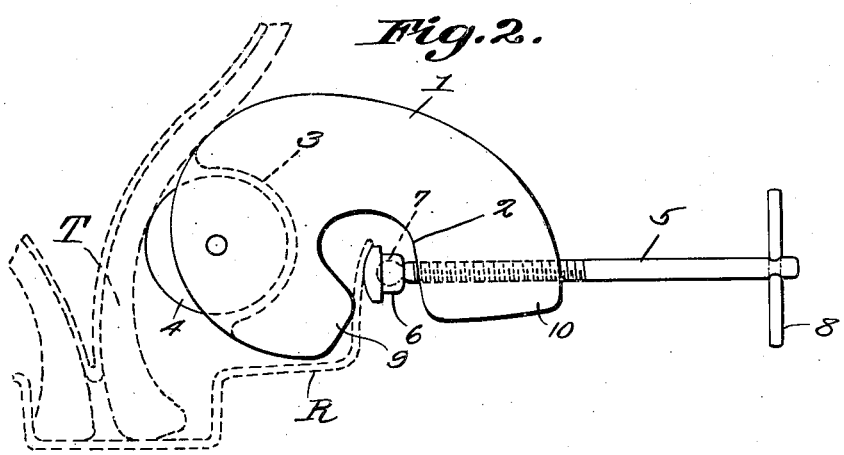
Figure 2 is an enlarged section on line 2—2 Figure 1.
Figure 3:
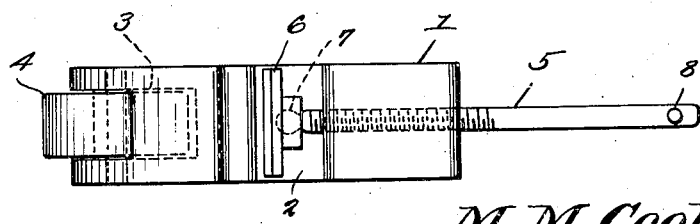
Figure 3 is a bottom plan view of the tool shown in Figure 2.

It will be noted that the outer periphery of the yoke is curved from one end to the other, and is outwardly bulged as to that portion of the yoke adjacent the roller (see Figure 2). Thus when the yoke is swung from one position to another this outer surface acts as a cam, thereby supplementing the action of the roller in shifting the tire relative to the rim on which the tool is mounted.

By mounting the foot 6 so that it can move on the screw 5, the parts can adapt themselves readily to different angles relative to the rim following the shifting of the tire.

What is claimed is:

A tire tool comprising a yoke having its outer side curvingly bulged to define a cam surface adjacent one end, said end being proportioned for insertion between a wheel rim flange and a loosened tire to be removed, the yoke having a recess formed in its inner side proportioned to receive the rim flange loosely, an antifriction roller journaled within the yoke and projecting outwardly therefrom, said roller being disposed close to the cam surface and between the cam surface and the inserted end of the yoke, the roller being mounted to move radially of a tire engageable thereby as said yoke is swung about said rim flange, thus to bring the roller and cam face successively against the tire side wall to press it inwardly away from the rim flange, and a screw adjustably mounted in the other end of the yoke and having its inner end projecting into the recess whereby to tighten the yoke to the rim flange, the outer end of the screw being extended outwardly from the yoke to provide a lever.

MILFORD MARCUISE COOK.

REFERENCES CITED

The following references are of record in the file of this patent:

UNITED STATES PATENTS

| Number | Name | Date |
|---|---|---|
| 834,908 | Hussey | Nov. 6, 1906 |
| 1,043,208 | Dahl | Nov. 5, 1912 |
| 1,090,290 | Edington et al. | Mar. 17, 1914 |
| 1,319,617 | Reininger | Oct. 21, 1919 |
| 1,498,816 | Smith et al. | June 24, 1924 |
| 1,806,947 | Mjelva | May 26, 1931 |
| 1,952,453 | Mueller | Mar. 27, 1934 |

FOREIGN PATENTS

| Number | Country | Date |
|---|---|---|
| 431,287 | Great Britain | July 4, 1935 |